United States Patent [19]

Tanno

[11] Patent Number: 5,218,594

[45] Date of Patent: Jun. 8, 1993

[54] RECORDING MEDIUM WITH AN OPTICAL WAVEGUIDE AND PLAYER FOR PLAYING THE SAME

[75] Inventor: Naohiro Tanno, Yamagata, Japan

[73] Assignee: Pioneer Electric Corporation, Japan

[21] Appl. No.: 664,286

[22] Filed: Mar. 6, 1991

[30] Foreign Application Priority Data

Mar. 8, 1990 [JP] Japan .................................. 2-59533

[51] Int. Cl.$^5$ .............................................. G11B 7/00
[52] U.S. Cl. .................................. 369/100; 369/275.1; 369/111; 369/103
[58] Field of Search ............... 369/275.1, 275.2, 275.3, 369/275.4, 275.5, 100, 103, 109, 111, 94, 95; 365/106, 12 T

[56] References Cited

U.S. PATENT DOCUMENTS

| | | | |
|---|---|---|---|
| 3,728,521 | 4/1973 | Borough et al. | 350/96.24 |
| 4,833,561 | 5/1989 | Sunagawa et al. | 369/44.23 |
| 4,876,680 | 10/1989 | Misawa et al. | 369/44.23 |
| 4,937,808 | 6/1990 | Shimada et al. | 369/112 |
| 4,945,525 | 7/1990 | Yamamoto et al. | 369/44.41 |
| 4,971,414 | 11/1990 | Funato et al. | 369/112 |
| 5,064,258 | 11/1991 | Inokuchi et al. | 369/103 |
| 5,065,390 | 11/1991 | Miyauchi et al. | 369/44.14 |

FOREIGN PATENT DOCUMENTS

| | | |
|---|---|---|
| 0276873 | 8/1988 | European Pat. Off. . |
| 0306342 | 3/1989 | European Pat. Off. . |
| 0338864 | 10/1989 | European Pat. Off. . |
| 3803178 | 8/1988 | Fed. Rep. of Germany . |
| 2-210626 | 8/1990 | Japan . |
| 2-210627 | 8/1990 | Japan . |

*Primary Examiner*—Tommy P. Chin
*Assistant Examiner*—Thai Tran
*Attorney, Agent, or Firm*—Wegner, Cantor, Mueller & Player

[57] ABSTRACT

An optical waveguide recording medium has optical waveguides on which minute refractive-index discontinuous portions for generating multiple reflected waveguide lights of different amplitudes and phases can be aligned in accordance with information to be recorded. A recorded-information reproducing apparatus splits a light beam from a light-emitting element into two, guides one of the split beams to the optical waveguides, and causes interference between a signal light reflected after modulation of the amplitude and phase of part of the guided beams and a light acquired by applying a frequency shift to the other beam to obtain an optical heterodyne output, thereby reproducing information recorded as a time-series signal waveform.

19 Claims, 3 Drawing Sheets

RECORDING MEDIUM WITH AN OPTICAL WAVEGUIDE AND PLAYER FOR PLAYING THE SAME

BACKGROUND OF THE INVENTION

1. Field of the Invention

The present invention relates to a recording medium with optical waveguides, and a player which employs the same for guiding a light beam to the optical waveguides, causing reflected part of the guided beam to interfere with a reference light beam for detecting the result, and reproducing recorded information as a time-series signal waveform, which player may also be referred to as a recorded-information reproducing apparatus.

2. Description of the related Art

A conventional optical recording medium, such as an optical disk, is constituted as shown in FIG. 1. This optical recording medium 100 is designed such that with a recording medium as a substrate, recesses 101 (pit recording portions) of low light reflectance, recorded on the substrate surface, and flat portions 102 of high light reflectance are aligned, so that reproduction may be performed while moving the recording medium in the direction of the arrow 103. The ratio of the reflectance of light from the flat portions 102 to that from the recesses 101 is as high as 1:0.3 to 0.5, the signal to noise (S/N) ratio of light intensity is not good enough, and it is difficult to improve the S/N ratio. According to this recording medium 100, a semiconductor laser beam is irradiated in converged manner on each recess 101 or each flat portion 102 for reading them out and then the reflected light is detected, so that a time-series signal may be reproduced only by moving the pit-recorded portions on the recording medium 100. The moving speed of the thus constituted recording medium 100 restricts the access time for reproduction as well as recording, making it difficult to realize high-speed access. Because reproduction or read-out depends on the light reflected from the flat portions, the surface density of the pit-recorded portions is limited, making it quite impossible to provide a three-dimensional lamination.

As shown in FIG. 2, a conventional recorded-information reproducing apparatus, which reproduces information recorded on an optical disk 24 designed as described above, comprises a semiconductor laser 11, lenses 12 to 15, a focus lens 16 mounted on a focus actuator, half mirrors 17 and 18, a ½-wavelength plate 19, a wave-shaping prism 20, photo sensors 21 to 23, and a beam splutter 25 constituted of a prism.

The light from the semiconductor 11 passes through the lens 12, wave-shaping prism 20, half mirror 17 and focus lens 16 to enter the recording medium 24. The reflected light from the recording medium 24 is then detected for reproduction of the recorded information.

If the optical disk 24 is a recording medium, such as a pit-formed recording medium or phase-change type recording medium, on which information is recorded as a change in refractive index caused by minute recording portions, the reflected light from the optical disk 24 is detected by the photo detector 21.

If, on the other hand, the optical disk 24 is a recording medium, like a photo-electromagnetic disk, on which information is recorded in the form of presence/absence of magnetic inversion, light reflected from the magnetism inverting recording portions of a minute area and having its deflection plane rotated is separated by the prism beam splitter 25 serving as an analyzer, and then the separated lights are respectively detected by the photo detectors 22 and 23.

At the time of information reproduction by this reproducing apparatus, to cause the optical pickup of the apparatus to follow up the surface vibration of the optical disk 24, the focus lens 16 and the like are moved along the optical axis in accordance with a focus error signal for focusing.

The conventional system has the following shortcomings:

(i) Since a light reflection system involving minute recording portions, such as pits, the light beam needs to be focused for every single recording portion on the recording medium. This impairs the S/N ratio of an optical signal and the amplitude modulation, thus reducing the reliability.

(ii) Since reproduction depends on reflection from the minute recording portions recorded on flat portions, the surface density of the recording portions is limited, making it impossible to ensure three-dimensional lamination.

(iii) Since an optical signal is reproduced for every single recording portion on the recording medium, a time-series signal is reproduced only by the movement of the recording medium. Therefore, the moving speed of the recording medium restricts the cycle period.

SUMMARY OF THE INVENTION

It is therefore an object of the present invention to overcome the above problems and provide an optical waveguide recording medium, which can constitute a high-density three-dimensional memory and permit a vest amount of information to be read out at one time with large S/N ratio as well as at very high speed, and a recorded-information reproducing apparatus for such a recording medium. To achieve this object, according to one aspect of the present invention, there are provided an optical waveguide recording medium having optical waveguides on which a plurality of minute refractive-index discontinuous portions for generating multiple reflected waveguide lights of different amplitudes and phases can be aligned in accordance with information to be recorded, and a recorded-information reproducing apparatus, which splits a light beam from a light-emitting element into two, guides one of the split beams to the optical waveguides, and causes interference between a signal light reflected after modulation of the amplitude and phase of part of the guided beam and a light acquired by applying Doppler frequency shift to the other beam to obtain an optical heterodyne output, thereby reproducing information recorded as a time-series signal waveform.

The optical waveguide recording medium has optical waveguides with an optical coupling portion for introducing a light beam, and multiple refractive-index discontinuous portions aligned in the optical waveguides in such a way that the shape and/or relative position of the refractive-index discontinuous portions become a variable for information to be recorded. It is preferable that the optical waveguides are channel type optical waveguides, in particular, ridge type optical waveguides. It is also preferable that the refractive-index discontinuous portions are recesses formed on a boundary surface of the optical waveguides. It is further preferable that the optical coupling portion is located at an end face of each of the optical waveguides. it is preferable that the optical waveguides recording medium is a plate made of multiple optical waveguides of a predetermined length arranged in parallel. It is also preferable that the optical waveguide recording medium is a disk with the optical waveguides running circularly so as to have the end faces arranged on a main surface of the disk.

The recorded-information reproducing apparatus for reproducing recorded-information from the above optical waveguides recording medium comprises a light-emitting means for generating a light beam, a splitting means for splitting the beam into first and second beams, a reference light generating means for receiving the first beam and applying frequency shift thereto for modulation thereof to generate a reference light, an irradiating means for guiding the second beam to the optical coupling portion, a light superimposing means for superimposing the reference light and reflected signal light reflected at the refractive-index discontinuous portions and returning via the optical coupling portion after modulation of the amplitude and phase of the reflected signal light to thereby provide an interference light, and a photo detecting means for photoelectrically converting the interference light to provide an electric output. It is preferable that the light-emitting means has a super luminescent diode. It is also preferable that the splitting means has a half mirror or a beam splitter. It is further preferable that the irradiating means has an objective lens, and the light superimposing means has a half mirror or a beam splitter.

It is preferable that the recorded-information reproducing apparatus further comprises a processing means, coupled to the photo detecting means, for detecting a beat output component from the electrical output to thereby output the amplitude of the reflected signal light, reflected in accordance with the mutual depth position of the refractive-index discontinuous portions, as an electrical amplitude signal.

Also, it is preferable that the reproducing apparatus according further comprises a processing means, coupled to the photo detecting means, for detecting a beat output component from the electrical output to thereby output the amplitude and delay time of the reflected signal light, reflected with a delay in accordance with the mutual depth position of the refractive-index discontinuous portions, as a time-series electrical signal.

A preferred embodiment of the present invention will be described below in detail in conjunction with the accompanying drawings.

DETAILED DESCRIPTION OF THE PREFERRED EMBODIMENT

Figure 1:
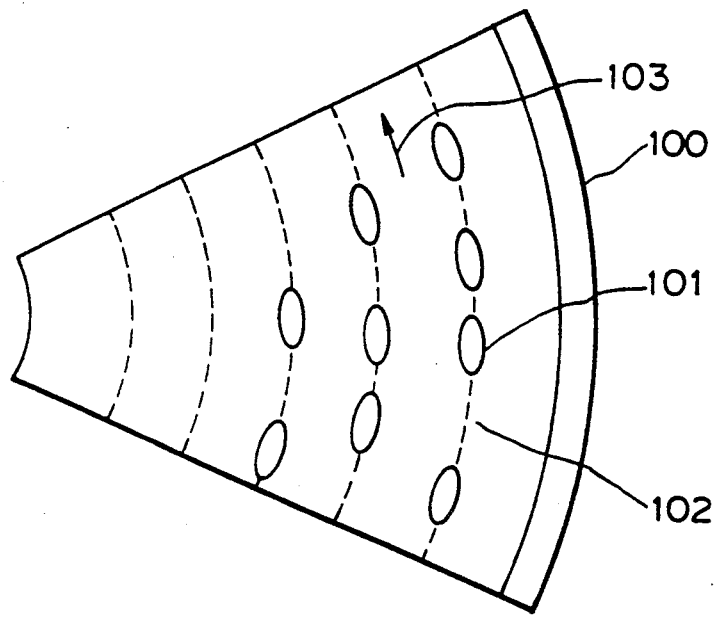
FIG. 1 is a partial plan view of an optical disk as an example of a conventional optical memory medium.
Figure 2:
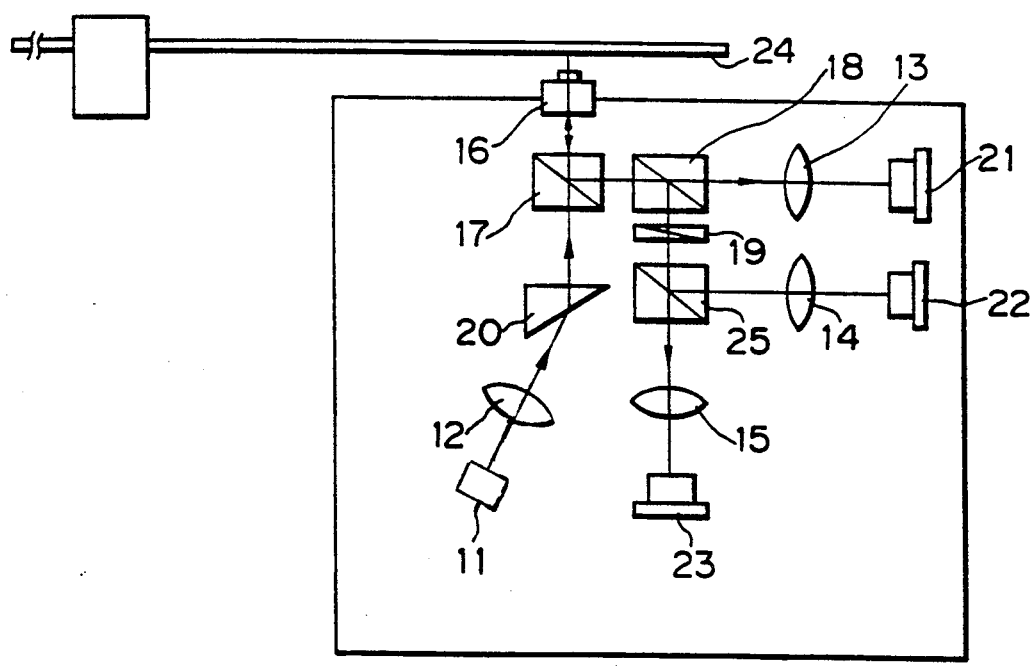
FIG. 2 is a schematic diagram exemplifying the structure of a conventional recorded-information reproducing apparatus.
Figure 3A:
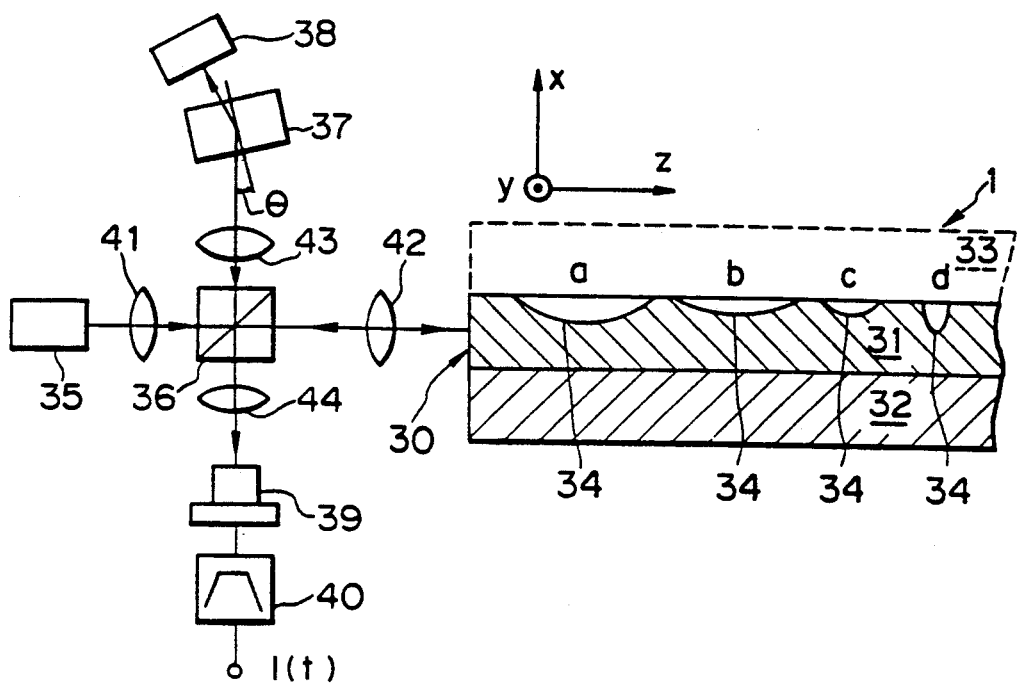
FIGS. 3A through 3C are schematic diagrams for explaining the principle of the present invention.

FIG. 3 presents a diagram for explaining the principle of the present invention. Referring to FIG. 3A, an optical waveguide recording medium 1 has such a structure that an optical waveguide 31 including a core for guiding light is formed on a substrate 32 serving as a clad. Air or a clad 33 lies above the upper boundary of the core 31. One end of the core 31 serves as an optical coupling portion 30 which guides a light beam in the core. On the upper boundary of the inner wall of the core are recorded multiple refractive-index discontinuous portions 34 aligned in the lengthwise direction. The discontinuous portions 34 are minute recesses which generate reflected waveguide light having various amplitudes and phases according to a complex refractive index based on the shape of the incident waveguide light of the beam and 1 or the relative position thereof from the optical coupling portion 30. The shape and positions of refractive-index discontinuous portions are to be recorded in such a way as to provide a predetermined complex refractive index in accordance with information to be recorded. In the diagram, the refractive-index discontinuous portions have a semicircular or semi-ellipsoidal shape of an embedded type and a size of a fraction of the light wavelength to several times the wavelength. The refractive index of the buried portions here is the refractive index of air or the clad layer. The same effect would be obtained if the refractive-index discontinuous portions existed on the core portion 31 of the optical waveguide or the clad layer 32. The optical waveguide recording medium comprises the elements 30 to 34 arranged in the above manner. As the materials for these elements, polycarbonate transparent to light may be used for the core portion 31, while a polymer material, such as polymethyl methacrylate with lower refractive index, may be used for the clad portion.

As shown in FIG. 3A, a recorded-information reproducing apparatus 1 for playing an optical waveguide recording medium comprises a light-emitting element 35, a half mirror (beam splitter) 36, an acoustic optical modulator 37, a mirror 38, an objective lens 42, a half mirror 36, and a photo detector 39. The light-emitting element 35, for example, a super luminescent diode, serves as a light-emitting means for generating a light beam. The half mirror 36 serves as a splitting means for splitting the light beam into first and second beams. The acoustic optical modulator 37 and mirror 38 serve as a reference light generating means, which 25 receives the first beam and applies Doppler frequency shift to this beam for its modulation to thereby generate a reference light. The objective lens 42 serves as an irradiating means for guiding the second beam out to the optical coupling portion 30. The half mirror 36 serves as a light superimposing means to superimpose the reference light and reflected signal light returning from the refractive-index discontinuous portions 34. The photo detector 39 serves as a photo detecting means for photoelectrically converting an interference light to provide an electrical output.

Figure 3B:
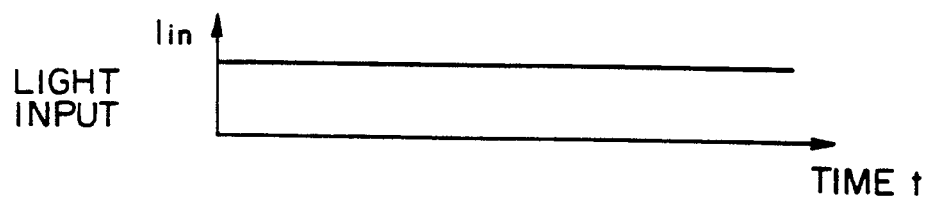

As illustrated in FIG. 3A, the light beam from the light-emitting element 35 facing the optical coupling portion of the recording medium is transformed into nearly parallel light by a lens 41, and then split into two parts by the half mirror 36. One beam, traveling straight, is focused by the objective lens 42, and guided into the optical coupling portion 30: part of this light beam is transformed into reflected waveguide light having multiple different amplitudes and phases by the refractive-index discontinuous portions 34, and becomes signal light returning from the optical coupling portion. As illustrated, as the shapes and relative positions of the individual refractive-index discontinuous portions 34 having the shapes and mutual positions as indicated by "a,""b,""c" and "d" are arranged in the optical waveguide in accordance with information to be recorded (expressed as analog information in the diagram), it is possible to produce modulated signal light having different amplitude and phase information as a function of the shapes and propagating distances. The other beam reflected by the half mirror 36 is converged by the lens 43 to enter the acoustic optical modulator 37. The beam is then reflected by the mirror 38 to reciprocate in the modulator 37 or is reflected by the movable mirror to be a reference light undergone Doppler frequency shifting. The incident angle (equivalent to the diffraction angle) to the modulator 37 is determined in accordance with the modulation frequency and the light wavelength. For instance, the incident angle may be set to $\theta = \pm 90$ degrees, in which case the mirror 38 becomes unnecessary. These signal light and reference light are combined by the half mirror 36, and the resultant light is focused by the lens 44 and is input to the photo detector 39 for optical heterodyne interference. The input light is photo-electrically converted into an electrical signal, which in turn is supplied through a frequency filter 40 to be an electrical output I(t) having a time-series signal waveform as shown in FIG. 3C with respect to a light input $I_{in}$ of a constant intensity from the light-emitting element 35 as shown in FIG. 3B.

The physical principle of the present invention will be discussed below. The individual frequency components of a partially coherent light beam from the light-emitting element 35 are simultaneously reflected at a single refractive-index discontinuous portion, and undergo phase delay proportional to a constant amplitude and propagating distance. Part of the resultant light becomes a signal light, which interferes with the reference light having undergone Doppler frequency shifting corresponding to the phase delay. At this time, the individual frequency components become in phase, forming a single pulse whose amplitude is the sum of the amplitudes of the individual frequency components. The next signal light of the reflected component from the refractive-index discontinuous portions, whose phase is further delayed, is delayed to interfere with the reference light subjected to Doppler frequency shifting, thereby producing the next pulse. The width of each pulse depends on the length of the refractive-index discontinuous portions along the lengthwise direction or the z-axis direction, and the amplitude of the pulse depends on the depth and width of the refractive-index discontinuous portions or the sizes in the x-axis direction and y-axis direction, respectively; the x-axis, y-axis and z-axis are normal to one another as shown in FIG. 3A.

Figure 3C:
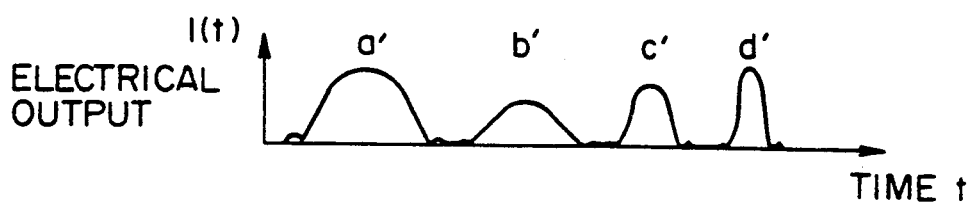

With the above arrangement of the reproducing apparatus, multiple refractive-index discontinuous portions recorded on the optical waveguide recording medium (indicated by "a,""b,""c" and "d" in FIG. 3A) are read out and then correspond to the time-series electrical output pulses (respectively indicated correspondingly to "a',""b',""c'" and "d'" in FIG. 3C), which are to be reproduced. The individual pulses have Nyquist sampling shapes expressed by sin(F)/F, and the signal waveform is a series of these sampling shapes. F is a function of the acoustic modulation frequency or the acoustic optical modulator or the moving speed of the movable mirror, the refractive index variance of the optical waveguide, the length and position of the refractive-index discontinuous portions in the optical waveguide, or the like. The signal modulation frequency can be set within a range from several KHz to several tens of KHz by properly selecting these values. The width of each pulse can also be set ranging from several tens of milliseconds to several tens of nanoseconds. The light-emitting element 35 should not necessarily be a semiconductor laser with a narrow spectrum width; rather semiconductor light-emitting element with a wide spectrum width close to that of incoherent light can provide higher modulation frequency. As another feature, the time-series signal waveform can be reproduced with high S/N ratio of $10^2$ to $10^4$ by the optical heterodyne interference method.

Figure 4:
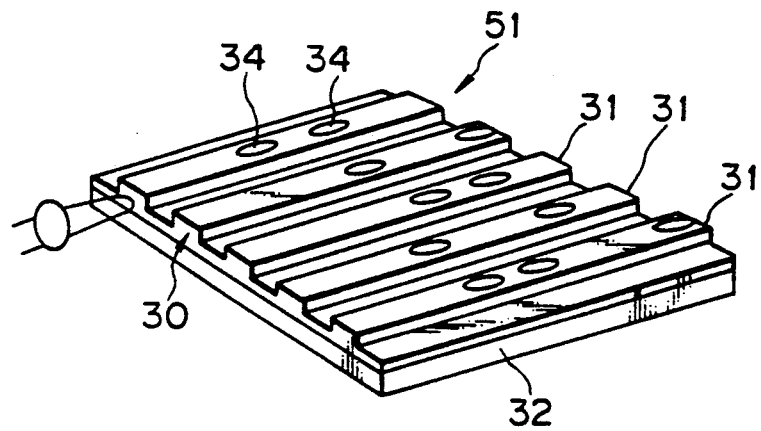
FIG. 4 is a perspective view of a plate-shaped optical waveguide recording medium according to the present invention.

The optical waveguide recording medium 1, as specifically shown in FIG. 4, may be a plate-shaped member having ridge type optical waveguides 31, each having one end serving as the optical coupling portion 30, aligned in parallel on the substrate 32, and further having a plurality of minute recesses or refractive-index discontinuous portions 34 arranged on the top of the cores of the optical waveguides in accordance with information to be recorded. Although this embodiment has been described with reference to the case where the recording medium 1 has ridge type optical waveguides, the optical waveguides may be channel type optical waveguides, such as strip type or embedded type.

Figure 5:
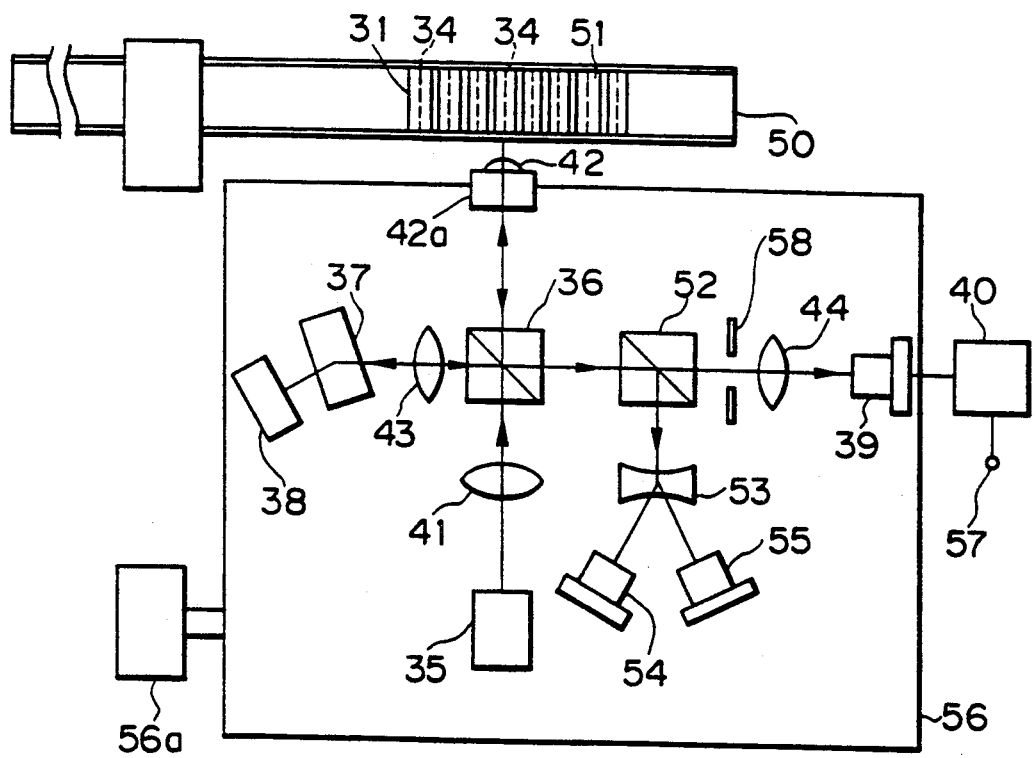
FIG. 5 is a schematic diagram of an optical waveguide recording medium and a recorded-information reproducing apparatus according to an embodiment of the present invention.

FIG. 5 illustrates an optical waveguide recording medium and a recorded-information reproducing apparatus according to a specific embodiment of the present invention. An optical waveguide recording medium 50 is a three-dimension optical disk of a laminated drum type, in which a strip or plate-shaped member 51 of the optical waveguide recording medium 1 is wound in drum shape so that the end faces of the optical waveguides are arranged on the main surface. This reproducing apparatus comprises a focus lens 42, a beam splitter 52, a concave lens 53, and tracking photo detectors 54 and 55, in addition to those described earlier. The focus lens 42 is mounted on a focus actuator 42a, and serves as a coupling means to the optical waveguides. The beam splitter 52 extracts part of a reflected beam for a tracking purpose. The concave lens 53 separates the tracking light beam. Both end portions of the beam from the light-emitting element 35 along the lengthwise direction of the ellipsoidal cross section are put against the end faces of the clad layer with the optical coupling portion of the core end held in-between, and the reflected light is used as the tracking light beam. The photo detectors 54 and 55 catch the tracking beam with high S/N ratio through the optical heterodyne detection. The reproducing apparatus further includes the mentioned focus actuator 42a, which moves the focusing microlens 42 or the like along the optical axis in accordance with error detection signals from both detectors to thereby focus the beam onto the optical coupling portion of the optical waveguides. The reproducing apparatus also includes a drive means 56a which allows a pickup head 56 to follow up the surface vibration of the three-dimensional optical disk 50 in accordance with a control signal and the error detection signals to thereby further scan the ends of the multiple optical waveguides.

According to this embodiment, the optical waveguide recording medium 51 having a rectangular cross section of 2×2 μm and a waveguide length of 10 mm is embedded in parallel at intervals of 2 μm in a 3.2 μm thick clad layer, and wound in a drum shape in lamination, thus providing the three dimensional optical disk 50 having a tracking pitch of 3.2 μm. The recorded refractive-index discontinuous portions have a length of 10 to 30 μm in the z-axis direction, a depth of 0.1 to 0.5 μm in the x-axis direction, and a width of about 0.7 μm in the y-axis direction. An average of five hundred discontinuous portions are recorded for each optical waveguide. The light refractive index of each refractive-index discontinuous portion is set not higher than $10^{-6}$ to $10^{-8}$, so that if a reflection loss should occur, the damping factor of the last returning beam would be about 10%. In the diagram, the cross sections of the individual optical waveguides are open to the lower end face of the three-dimensional optical disk 50, serving as the optical coupling portion. A polycarbonate protective film is provided 2mm thick on the end face of the three-dimensional optical coupling portion to ensure matching with the refractive index of the optical waveguides, thus improving the optical coupling strength. Likewise, the other end faces of the optical waveguides are also protected; the light beam propagating through the optical waveguides can escape at the same time. The three-dimensional optical disk 50 with this structure is 8 inches in diameter and recorded-information is reproduced while rotating this disk 50 as in the case of a compact disk (D).

The detection operation of the reproducing apparatus is as follows. The first beam from the light-emitting element 35 is guided to the optical waveguide recording media 51. Part of this beam has its amplitude and phase modulated, and becomes a signal reflected light beam, returning toward the half mirror 36. The other beam reciprocates in the acoustic optical demodulator 37, and becomes a reference beam, also returning toward the mirror 36. The signal light and the reference light are combined by the half mirror 36, and received by the photo detector 39 via an iris 58 that allows only the interfered signal light to pass through. The photo detector 39 subjects the received light to optical heterodyne detection. The resultant light passes through the frequency filter 40 to provide an electrical output having a time-series signal waveform indicated by I(t) in FIG. 3 from the electric output terminal 57. A reproduction signal from a single optical waveguide recording media is temporarily saved in a buffer memory, and then transferred at the proper clock timing. After the information held by one optical waveguide is read out, information recorded in the optical waveguide of the following channels are read out one by one by the head 56 tracking the three-dimensional optical disk 50 which is rotating.

According to the embodiment, the light-emitting element 35 in use is typically an SLD (Super Luminescent Diode) having a light emission center wave length of 1.3 μm and a light emission spectrum width of approximately $2\times10^{12}$ Hz, with the acoustic modulating frequency set to 355 MHz. Further, according to the optical waveguide recording medium of this embodiment, on which the refractive-index discontinuous portions are recorded with their length and mutual position set to an average of 20 μm, so that a recording/reproducing frequency of about 30 MHz can be realized. The minimum pulse width in this case is approximately 35 nanoseconds. The light-emitting element 35 has an optical output of approximately 1 mW, thus ensuring a high S/N ratio of the optical heterodyne interference output of 104 based on the reflected light and the reference light from the respective refractive-index discontinuous portions. The total memory capacity in terms of digital quantity would be 500 times the memory capacity of the existing compact disks (1 gigabytes), while the mechanical access time per bit would be 1/500 and the bit cycle time is about 14 times higher.

The description of this embodiment has been given with reference to the case where the memory section of the optical waveguide recording medium is constituted by the refractive-index discontinuous portions different from each other in size and shape, and an analog signal is to be recorded and reproduced. If the refractive-index discontinuous portions are the same in size and shape and the presence/absence of those portions is recorded at the equal intervals, however, it is apparently possible to record and reproduce a digital signal. Although the foregoing description has been given with reference to the optical waveguide recording medium formed into a three-dimensional disk, the recording medium may be arranged in parallel into a tape or card type which is then laminated. Further, although the length of the optical waveguide as a recording medium is set to 10 mm in this embodiment, this length can be set longer or shorter in accordance with the necessary memory capacity.

As described above, the optical waveguide recording medium and the recorded-information reproducing apparatus according to the present invention have advantages such that a vast amount of information can be read out at high speed by simply irradiating a constant incoherent light beam with a wide spectrum width on the recording medium, and a three-dimensional, high-density memory can be realized. This recording medium and the reproducing apparatus can realize an optical memory and recorded-information reproducing technology, and are therefore very effective as a large-capacity, high-speed optical recording medium for use in computers or computer systems and its reproducing apparatus, or a large-capacity, three-dimensional compact disk or a large-capacity, high-speed three-dimensional video disk for use in high-definition systems and its reproducing apparatus, or a large-capacity laminated optical card and its high-speed reproducing apparatus.

What is claimed is:

1. An optical waveguide recording medium comprising:
    optical waveguides each having an optical coupling portion for receiving a light beam; and
    multiple refractive-index discontinuous portions generating reflected light due to said light beam and arranged in the optical waveguide in such a way that at least one of the shape and relative position of the refractive-index discontinuous portions becomes a variable for information to be stored.

2. The recording medium according to claim 1, wherein the optical waveguides are channel type optical waveguides.

3. The recording medium according to claim 2, wherein the optical waveguides are ridge type optical waveguides.

4. The recording medium according to claim 1, wherein the refractive-index discontinuous portion are recesses formed on a boundary surface of the optical waveguides.

5. The recording medium according to claim 1, wherein the optical coupling portion is located at an end face of each of the optical waveguides.

6. The recording medium according to claim 1, wherein the optical waveguide recording medium is a plate made of multiple optical waveguides of a predetermined length arranged in parallel.

7. The recording medium to claim 6, wherein the plate-shaped optical waveguide recording medium is a disk with the optical waveguides running circularly so as to have the end faces arranged on a main surface of the disk.

8. A recorded-information reproducing apparatus for reproducing recorded-information from an optical waveguide recording medium having optical waveguides with an optical coupling portion for receiving a light beam, and multiple refractive-index discontinuous portions arranged in the optical waveguides in such a way that at least one of the shape and mutual position become a variable for information to be recorded, the apparatus comprising:

a light-emitting means for generation a light beam;

a splitting means for splitting the beam into first and second beams;

a reference light generating means for receiving the first beam and applying frequency shift thereto for modulation thereof to generate a reference light;

an irradiating means for guiding the second beam to the optical coupling portion;

a light superimposing means for superimposing the reference light and reflected signal light reflected at the refractive-index discontinuous portions and returning via the optical coupling portion after modulation of the amplitude and phase of the reflected signal light to thereby provide an interference light; and a photo detecting means for photoelectrically converting the interference light to provide an electrical output.

9. The reproducing apparatus according to claim 8, further comprising a processing means, coupled to the photo detecting means, for detecting a beat output component from the electrical output to thereby output the amplitude of the reflected signal light, reflected in accordance with the position relative to a depth of the refractive-index discontinuous portions, as an electrical amplitude signal.

10. The reproducing apparatus according to claim 8, further comprising a processing means, coupled to the photo detecting means, for detecting a beat output component from the electrical output to thereby output the amplitude and delay time of the reflected signal light, reflected with a delay in accordance with the position relative to the depth of the refractive-index discontinuous portions, as a time-series electrical signal.

11. The reproducing apparatus according to claim 8, wherein the light-emitting means has a super luminescent diode.

12. The reproducing apparatus according to claim 8, wherein the splitting means has a half mirror or a beam splitter.

13. The reproducing apparatus according to claim 8, wherein the irradiating means has an objective lens.

14. The reproducing apparatus according to claim 8, wherein the reference light generating means has an acoustic optical modulator.

15. The reproducing apparatus according to claim 8, wherein the reference light generating means has a mirror.

16. The reproducing apparatus according to claim 8, wherein the reference light generating means has a movable mirror.

17. The reproducing apparatus according to claim 8, wherein the light superimposing means has a half mirror or a beam splitter.

18. The reproducing apparatus according to claim 8, wherein the photo detecting means has a photo detector.

19. The reproducing apparatus according to claim 8, further comprising a driving means for altering a relative position between the optical coupling portion of the optical waveguide recording medium and an objective lens.

* * * * *